(12) United States Patent
Yamaguchi et al.

(10) Patent No.: US 7,048,373 B2
(45) Date of Patent: May 23, 2006

(54) RIMLESS EYEGLASSES AND PARTS THEREOF

(75) Inventors: Jitsuko Yamaguchi, Fukui (JP); Katsushi Yamaguchi, Fukui (JP)

(73) Assignee: Inada Project Co., Ltd., Fukui-ken (JP)

( * ) Notice: Subject to any disclaimer, the term of this patent is extended or adjusted under 35 U.S.C. 154(b) by 199 days.

(21) Appl. No.: 10/754,721

(22) Filed: Jan. 12, 2004

(65) Prior Publication Data

US 2005/0275793 A1  Dec. 15, 2005

(30) Foreign Application Priority Data

Feb. 17, 2003 (JP) .............................. 2003-037858
Jul. 14, 2003 (JP) .............................. 2003-196463

(51) Int. Cl.
*G02C 1/02* (2006.01)

(52) U.S. Cl. ...................................... 351/110; 351/124

(58) Field of Classification Search ................ 351/110, 351/124, 41, 158
See application file for complete search history.

(56) References Cited

U.S. PATENT DOCUMENTS 6,860,597 B1 *  3/2005  Carlon ........................ 351/110
2003/0071962 A1 *  4/2003  Nishihara .................... 351/110

* cited by examiner

*Primary Examiner*—Hung Xuan Dang
(74) *Attorney, Agent, or Firm*—Wenderoth, Lind & Ponack, L.L.P.

(57) ABSTRACT

To manufacture rimless eyeglasses without soldering the parts and to make the assembling easy, a bridge and two joint pieces are provided by cutting or punching a piece of metal sheet into a required flat shape. The bridge comprises a crossbar having two pin-like extensions, two press-fitting extensions and two leg extensions integrally connected to the opposite ends of the crossbar. The pin-like extensions have saw-tooth indentations formed on their surfaces, and the leg extensions end with hooks for fixedly holding nose pads. Each joint piece has a pin-like extension with saw-tooth indentations formed on its surface and a press-fitting extension. Each lens has a through hole and a notch made on either side. Each through hole has a flanged sleeve press-fitted therein, and the pin-like extensions of the bridge and joint pieces are inserted into the flanged sleeves in the through holes of the lenses, and the press-fitting extensions of the bridge and joint pieces are inserted into the notches of the lenses.

8 Claims, 16 Drawing Sheets

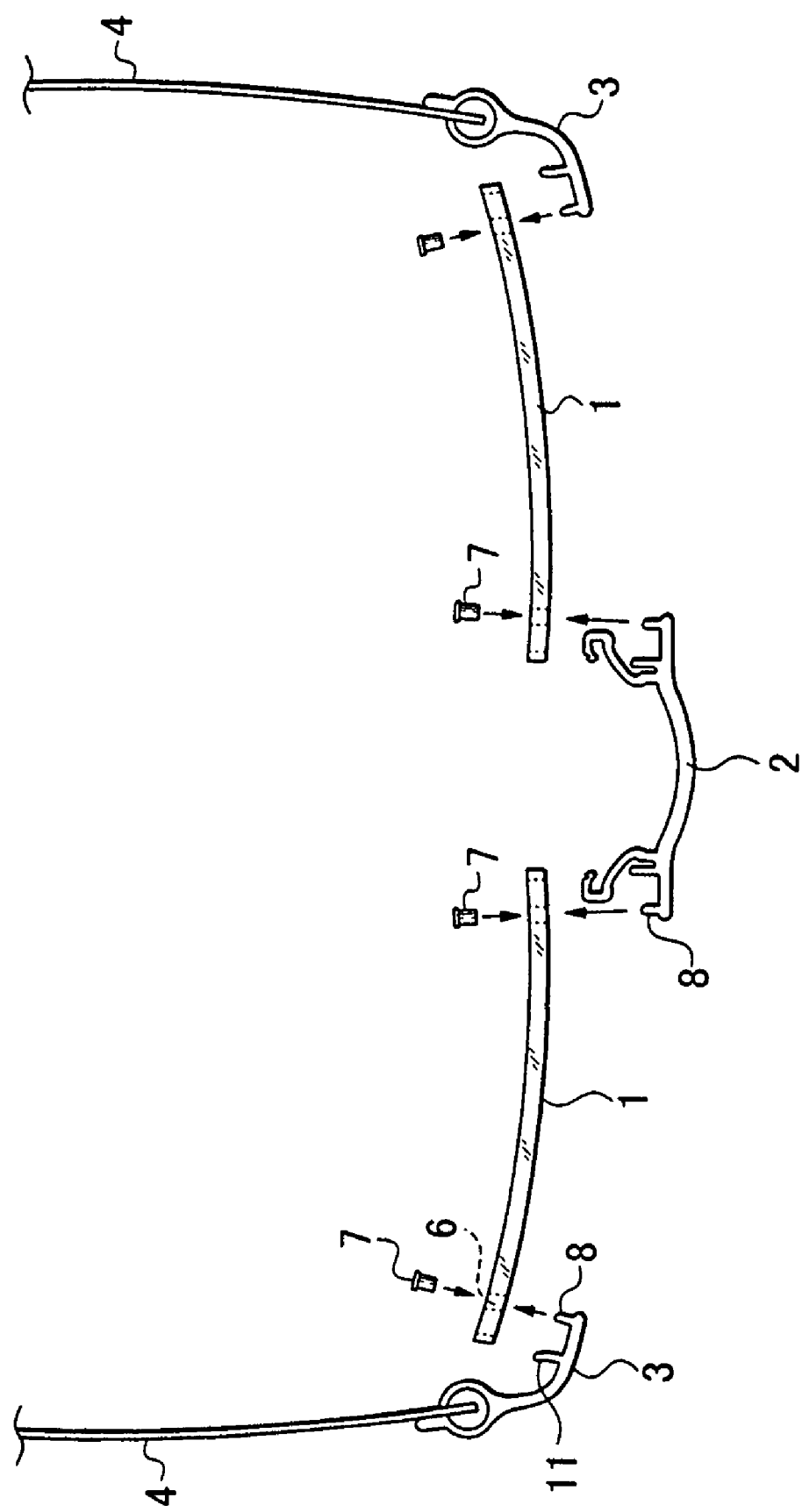

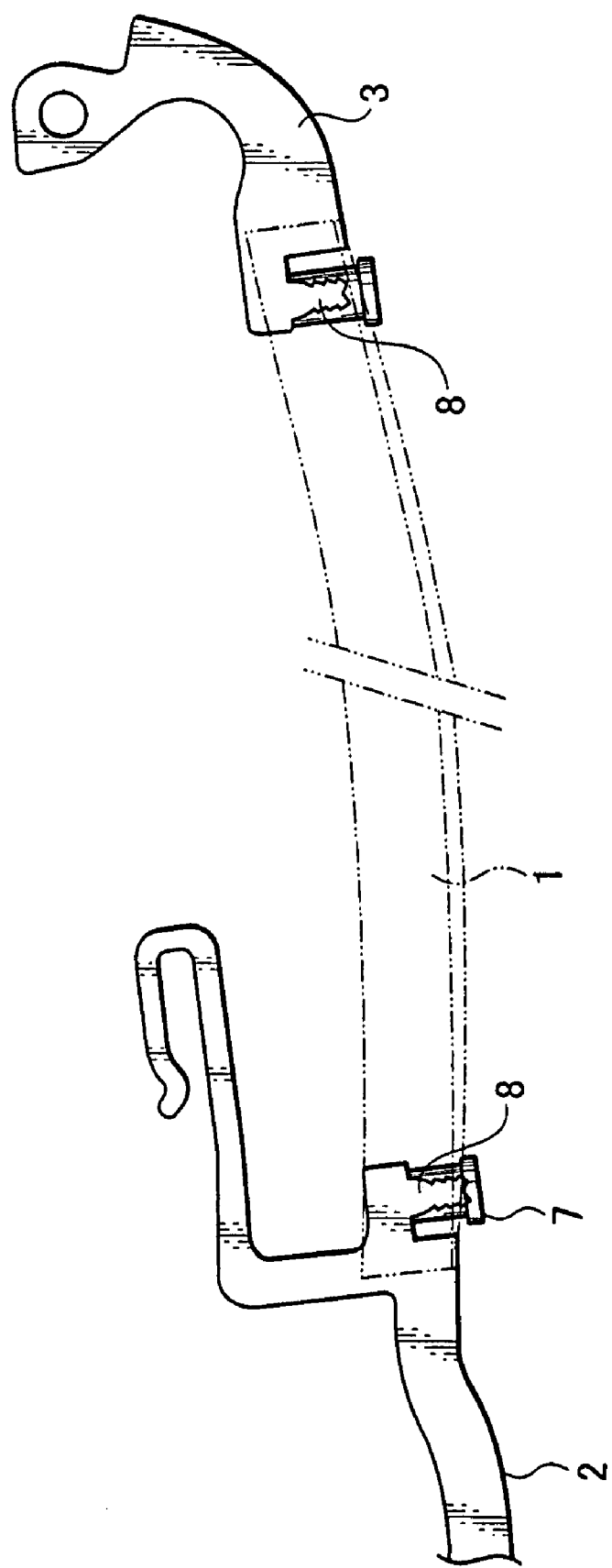

Fig. 15(a)
Fig. 15(b)
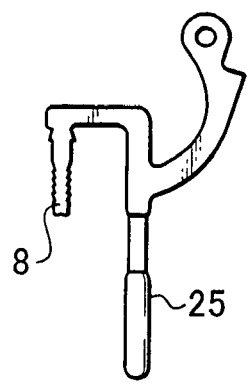 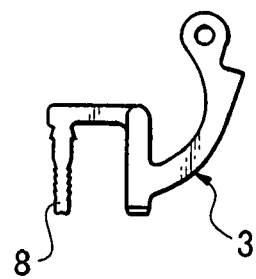 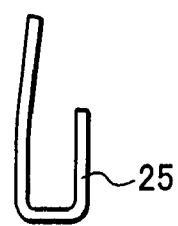

RIMLESS EYEGLASSES AND PARTS THEREOF

BACKGROUND OF THE INVENTION

1. Field of the Invention

The present invention relates to rimless eyeglasses whose lenses are directly connected to each other and to the temples without rims, and to the hinge structure for the temples.

2. Related Art

FIG. 20 shows ordinary rimless eyeglasses. As shown, both lenses "a" are connected to each other by screwing to a bridge "b". Each lens "a" has a joint piece "c" screwed to its outer edge, and a temple "d" is foldably hinged to the joint piece "c". The bridge "b" has nose pads "e" fixed to its leg ends.

As described, the bridge "b" is fastened to the lenses "a" with minute screws "g", and likewise, the joint pieces "c" are fastened to the lenses "a" with minute screws "g". To prevent angular rotation of the bridge or joint piece about a single screw "g", the bridge and joint piece are equipped with anti-rotary pieces "f", thereby preventing the bridge and joint pieces from turning, and assuring they stick to the lenses "a".

If the screws "g" are loosened, however, the lenses "a" and associated parts "b" and "c" cannot be tightly fastened together even though the anti-rotary pieces "f" are applied to the outer circumferences of the lenses "a".

The bridge "b", joint pieces "c" and temples "d" are made by cold-pressing wires into required shapes. Metal molds for pressing and shaping minute articles are very expensive. Screwing such minute parts to lenses is tedious and time-consuming work. Disadvantageously the bridge "b" and its opposite legs (to which the nose pads "e" are fixed) cannot be pressed and shaped as a whole. As a matter of fact, the separate legs need to be soldered to the opposite ends of the bridge "b". Likewise, the joint piece "c" and its fastening tab "h" cannot be pressed and shaped as a whole, and the separate tabs "h" need to be soldered to the joint piece "c".

The hinge structure has similar problems. It is so small that it cannot be made with ease, and hinging the temple "d" to the joint piece "c" is tedious and time-consuming work. Still disadvantageously, the temple "d" is apt to wear on its parts which are rubbed against the hinge; the friction against the temple causes the wears. As a result, the temple "d" is loosely connected to the hinge, and therefore, the screw must be tightened from time to time. The assembling and soldering of parts into the joint piece and the bridge cannot assure that these articles are provided with precision. As a result, they cannot be always exactly aligned with the minute holes made in the lens "a". Such misalignment, in fact, causes loosening of the temple and/or joint pieces relative to the lens, and what is worse, may prevent the parts from being assembled into eyeglasses.

SUMMARY OF THE INVENTION

In view of the above one object of the present invention is to provide rimless eyeglasses whose parts can be easily assembled without soldering.

Another object of the present invention is to provide a bridge and a joint piece which assure that the eyeglasses are free of loosening in the temples and/or bridge.

To attain these objects rimless eyeglasses comprising two lenses, a bridge whose opposite ends are connected to the inner edges of the two lenses, two joint pieces fixed to the outer edges of the two lenses, and two temples hinged to the joint pieces, are improved according to the present invention in that: the bridge is provided by cutting or punching a piece of metal sheet into a required flat shape comprising a crossbar having two pin-like extensions, two press-fitting extensions and two leg extensions integrally connected to the opposite ends of the crossbar, the pin-like extensions having saw-tooth indentations formed on their sides, and the leg extensions ending with hooks for fixedly holding nose pads; each joint piece is provided by cutting or punching a piece of metal sheet into a required flat shape having a pin-like extension with saw-tooth indentations formed on its sides and a press-fitting extension; each lens has a through hole and a notch made on either side, each through hole having a flanged sleeve press-fitted therein, the pin-like extensions of the bridge and joint pieces being inserted into the flanged sleeves in the through holes of the lenses, and the press-fitting extensions of the bridge and joint pieces being inserted into the notches of the lenses.

The rimless eyeglasses according to the present invention are principally similar in structure to the conventional one: two lenses are connected to the opposite ends of the bridge; and the temples are foldably hinged to the lenses via joint pieces. The bridge, joint pieces and temples are made by cutting a sheet of metal of predetermined thickness. A piece of metal sheet may be punched, laser-cut or wire-cut into a desired shape. The precision cutting can be attained with a computer aided machining system.

No screws are used in fastening the bridge and joint pieces to the lenses. The two pin-like extensions are integrally connected to the opposite ends of the bridge as a whole, and likewise, one pin-like extension is integrally connected to the joint piece as a whole. Each pin-like extension has saw-tooth indentations formed on its surface. A flanged sleeve of resin material is press-fitted in each through hole in the lens. The flange of the flanged sleeve is larger than the through hole, and therefore, the flanged sleeve is caught by the flange with its hollow shank inserted into the through hole. The pin-like extension is inserted in the sleeve from its flange-less side. Thus, the bridge is fastened to the lens with the pin-like extensions inserted into the flanged sleeves in the through holes of the lenses. Likewise, the joint piece is fastened to either outer edge of each lens.

Then, the saw-tooth indentations of the pin-like extension cut into the inside of the flanged sleeve to be fixedly caught. The flanged sleeve is expanded by forcedly inserting the pin-like extension in the flanged sleeve, thereby making it stick to the hole. The pin-like extension is formed by punching a piece of metal sheet, and therefore its cross section is rectangular. The pin-like extension comes in contact with the circular hole at the four corners, leaving arc spaces between the four sides of the square pin and the circular hole. This permits smooth insertion of the pin-like extension into the hole thanks to minimum friction. Square holes, however, may be made in the lens.

The bridge is fastened to the lenses with its pin-like extensions inserted in the flanged sleeves in the lens holes next to the bridge, and likewise, the joint pieces are fastened to the lenses with their pin-like extensions inserted in the flanged sleeves in the lens holes next to the joint piece. To prevent any relative rotation around each pin-like extension the bridge and joint pieces are fastened to the lenses with their press-fitting extensions inserted in the notches of the lenses. Alternatively the press-fitting extensions may be so shaped in the form of the letter "U" as to pinch the periphery of the lens. The angular rotation can be prevented by applying such press-fitting extensions to the lenses.

Each joint piece may have a ring shape at its free end, and a circular disc pivot of resin material is rotatably fitted in the ring. Each temple has a bifurcate end, comprising two arm extensions each having nails formed inward. These arms are fastened to the circular disc pivot by sandwiching it with the nails cut into the circular disc, so that the temple can rotate around the end of the joint piece, and can fold and lie on the front. When demanded a conventional hinge structure may be used, and then one piece of the hinge may be integrally connected to the joint piece as a whole, whereas the other piece is fastened to the temple end. The eyeglasses can be given a resin appearance by coating the metal parts, i.e. the bridge and joints with a resin material.

Other objects and advantages of the present invention will be understood from the following description of eyeglasses according to preferred embodiments of the present invention, which are shown in the accompanying drawings.

BRIEF DESCRIPTION OF THE DRAWINGS

FIG. 2 is an exploded view of the rimless eyeglasses;

FIG. 9 illustrates another manner in which the bridge, lens and joint pieces can be connected to each other;

FIGS. 15a and 15b illustrate still another joint piece shape;

DETAILED DESCRIPTION OF PREFERRED EMBODIMENTS

Figure 1A:
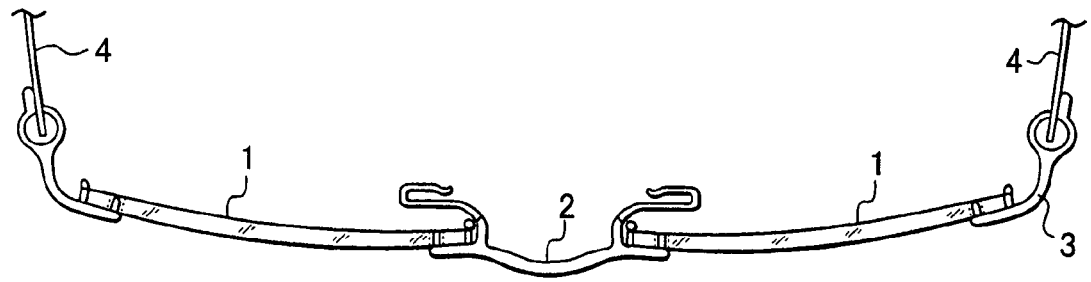
FIGS. 1a and 1b are plan and front views showing rimless eyeglasses according to the present invention, respectively.
Figure 1B:
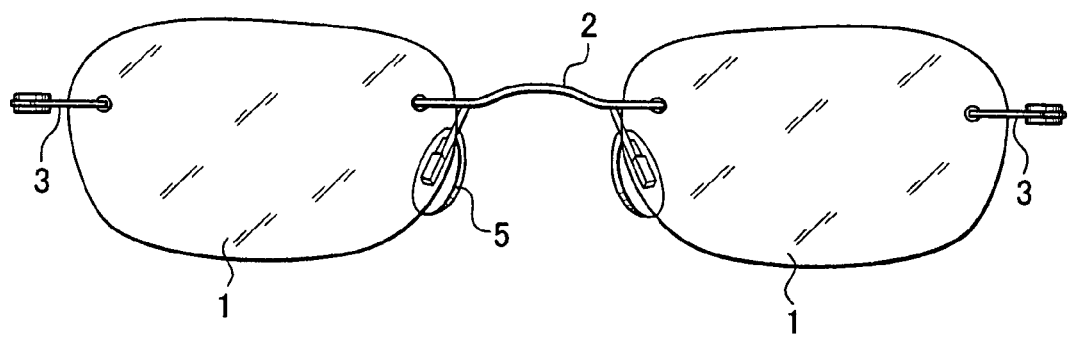

Referring to FIGS. 1a and 1b, rimless eyeglasses according to one preferred embodiment of the present invention comprise two lenses 1, a bridge 2 whose opposite ends are connected to inner edges of the two lenses 1, two joint pieces 3 fixed to the outer edges of the two lenses 1, and two temples 4 hinged to the joint pieces 3. As shown, the bridge 2 has two legs integrally connected to its opposite ends, and each leg has a nose pad 5 attached to its end. Referring to FIGS. 4a–4d, the bridge 2 is shaped by cutting or punching a piece of a metal sheet into a required flat shape (FIG. 4a), comprising a crossbar 10 having two pin-like extensions 8, two press-fitting extensions 11 and two leg extensions 12, all integrally connected to the opposite ends of the crossbar 10. The pin-like extensions 8 have saw-tooth indentations formed on their opposite sides, and the leg extensions 12 end with hooks 13 for fixedly holding nose pads 5. The flat-shaped bridge (FIG. 4a) is bent into the three-dimensional bridge shape (FIGS. 4b and 4c), as later described.

Figure 3:
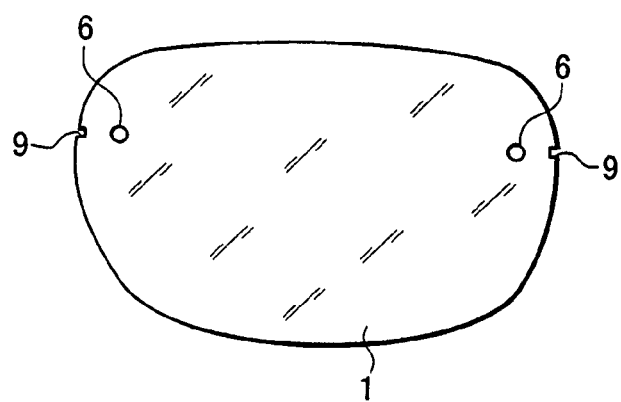
FIG. 3 is a front view of the lens.
Figure 5:
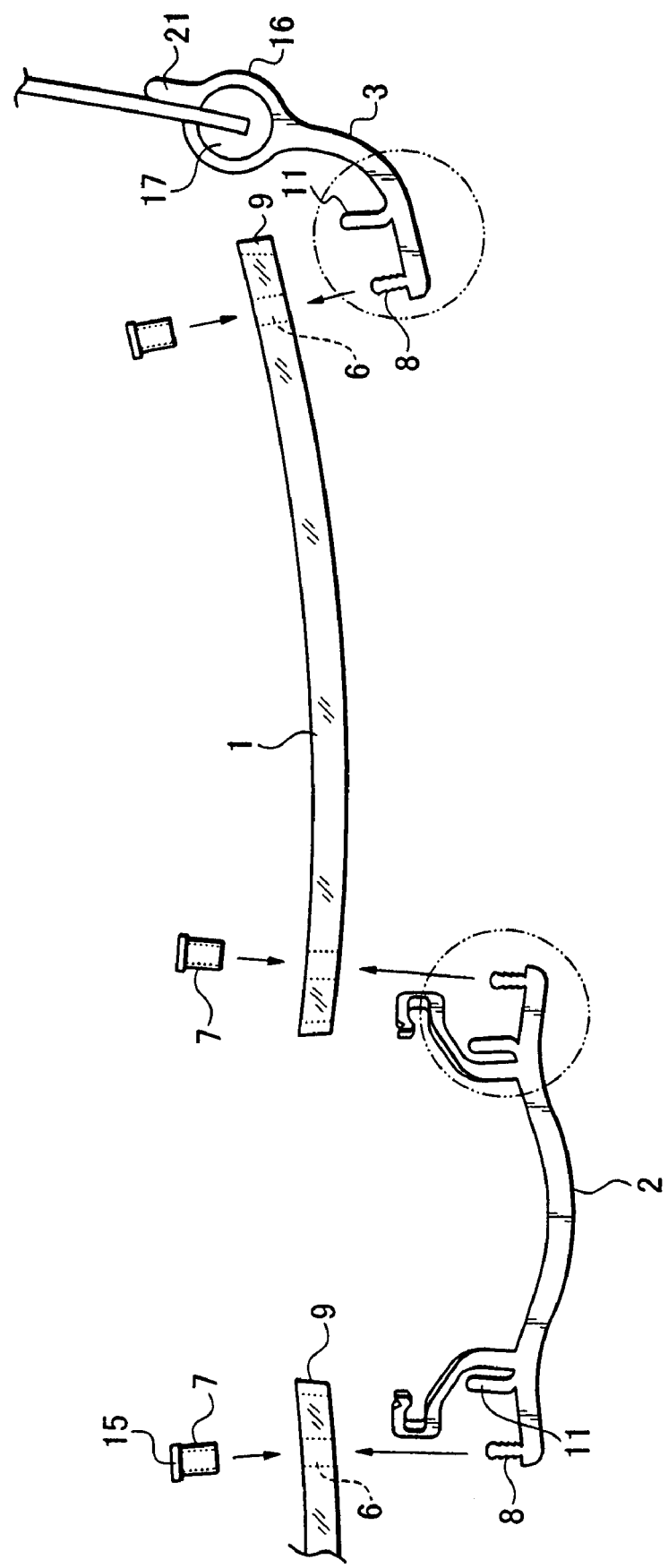
FIG. 5 illustrates how the bridge, lens and joint pieces can be connected to each other.
Figure 10:
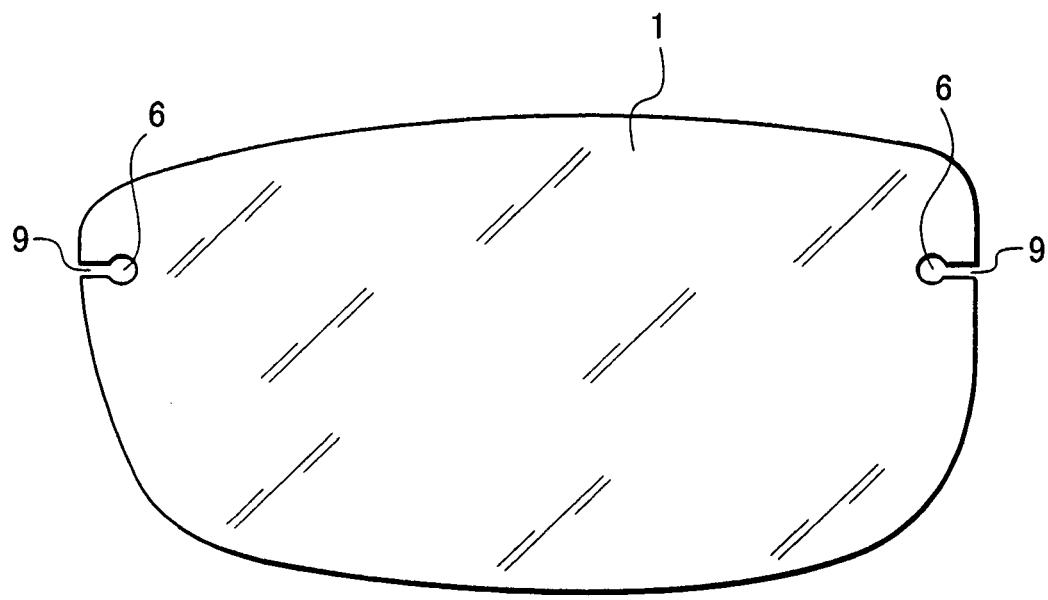
FIG. 10 illustrates another lens shape.

Referring to FIG. 5, each joint piece 3 is shaped by cutting or punching a piece of metal sheet into a required flat shape having a pin-like extension 8 and a press-fitting extension 11. The pin-like extension 8 has saw-tooth indentations formed on its surface. Referring to FIG. 3, each lens 1 has a through hole 6 and a notch 9 made on either side. The through hole 6 and the notch 9 are shown independent from each other, but they may be made to communicate with each other (see FIG. 10).

Now, referring to FIG. 2, a flanged sleeve 7 of resin material is press-fitted in each through hole 6 of each lens 1 until its flange is caught on the rear side of the lens 1, and then the bridge 2 and the joint pieces 3 are connected to the lenses 1 by inserting their pin-like extensions 8 and press-fitting extensions 11 in the through holes 6 and notches 9 of the lenses 1, respectively. Insertion of the pin-like extensions 8 in the resin sleeves 7 expands their outer circumferences in the through holes 6, thereby making the pin-like extensions 8 to be tightly gripped and held in the through holes 6 of the lenses 1.

Figure 4A:
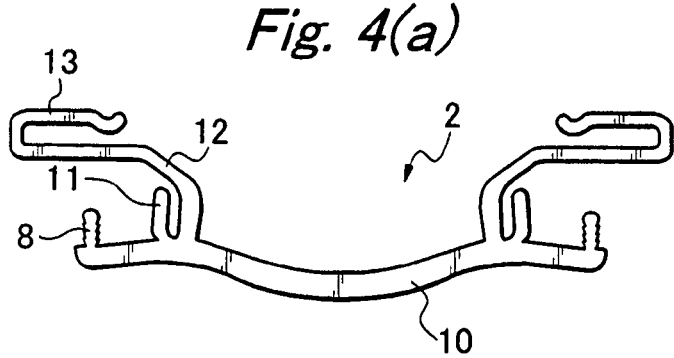
FIGS. 4a, 4b, 4c and 4d illustrate how the bridge can be made.
Figure 4B:
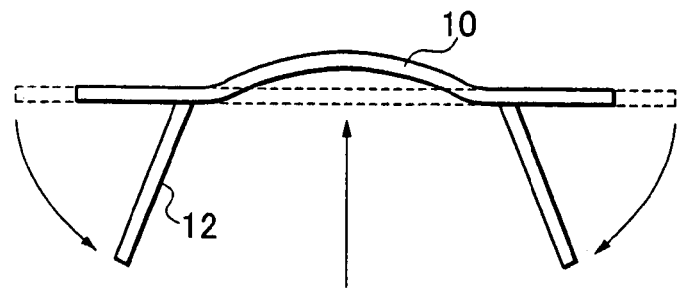
Figure 4C:
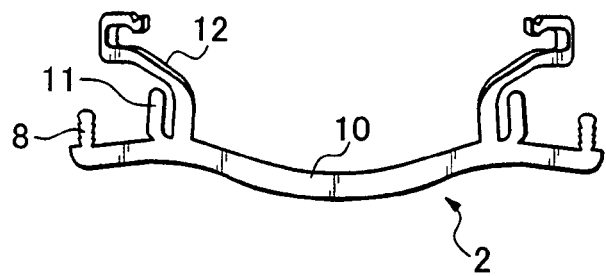
Figure 4D:
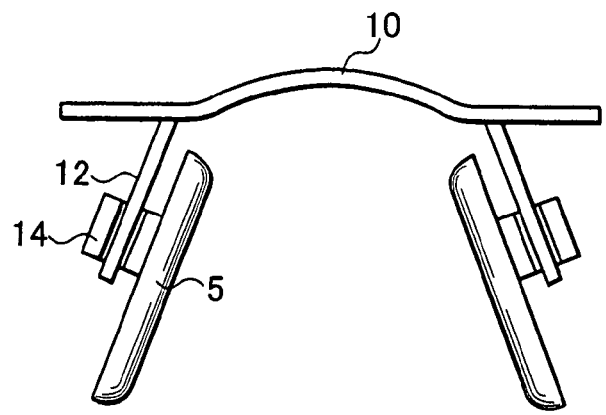

Referring to FIGS. 4a–4d again, a piece of metal sheet is cut or punched into a required flattened bridge shape (FIG. 4a), as described above. The flat bridge shape (FIG. 4a) is bent into a three-dimensional bridge by bending its opposite legs down and by curving the crossbar (FIG. 4b). A nose pad 5 is attached to the hook 13 of each leg 12 (FIG. 4d).

As seen from FIG. 4d, the nose pad 5 has a grooved projection 14 formed on its rear side, and the nose pad 5 is attached to the hook 13 by allowing the hook 13 to snap into the groove of the rear projection 14 of the nose pad 5. The pin-like extensions 8, press-fitting extensions 11 and leg extensions 12 are integrally connected to the opposite ends of the crossbar 10 as a whole. No soldering work, therefore, is required in fixing these minor parts to the bridge. Instead, such extensions are provided automatically by cutting or punching and bending.

The pin-like extension 8 is formed by cutting or punching a piece of metal sheet, and therefore its cross section is rectangular. The square pin-like extension 8 can be easily inserted into the flanged sleeve 7 because of the least point-friction therebetween. The saw-tooth indentations of pin-like extensions 8 prevent the pin-like extensions 8 from departing from the lens 1. FIG. 5 shows how the lenses 1 can be joined to each other by the bridge 2, and how either temple is hinged to the lens 1 by the joint piece 3.

As seen from FIG. 5, the flanged sleeves 7 are inserted into the through holes 6 of the lens 1. Then, the bridge 2 and the joint piece 3 are applied to the lens 1 by inserting their pin-like extensions 8 and press-fitting extensions 11 into the through holes 6 and notches 9, respectively. The bridge 2 and joint pieces 3 are fixedly caught by the through holes 6 and notches 9 thanks to their saw-tooth indentations, and their angular rotation around the pin-like extensions can be prevented thanks to their press-fitting extensions 11 in the notches 9. Thus, rimless eyeglasses as shown in FIG. 1 are provided.

Each joint piece 3 hinges the temple 4 to the lens 1 although the hinge structure is different from the conventional one. As shown in FIG. 5, the joint piece 3 has a ring 16 formed at its free end, and the ring 16 has a circular disc pivot 17 of resin material rotatably fitted therein. The temple 4 is fixed to the resin disc pivot 17. For one example, each temple 4 has two arm extensions formed at one end, which arms are fastened to the circular disc pivot by sandwiching it, as just described below with reference to FIGS. 6a–6d.

Figure 6A:
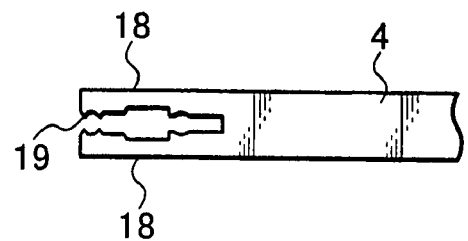
FIGS. 6a, 6b, 6c and 6d illustrate one manner in which the temple can be fixed to the joint piece.

Particularly FIG. 6a shows the end of the temple 4. The temple 4 is made by cutting or punching a piece of metal sheet. As seen from the drawings, the temple 4 has upper and lower arm extensions 18 formed at one end, and each arm extension 18 has small nails 19 formed on its inner surfaces.

Figure 6B:
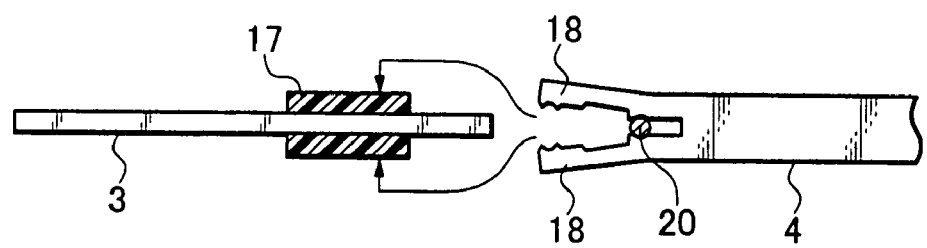

FIG. 6b shows how the temple 4 can be fixed to the circular disc pivot 17 of the joint piece 3. As shown, a pin 20 is pushed into the slit of the temple end to expand the opposite arm extensions 18 wide.

Figure 6C:
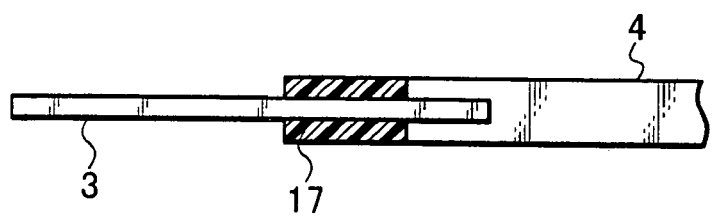
Figure 6D:
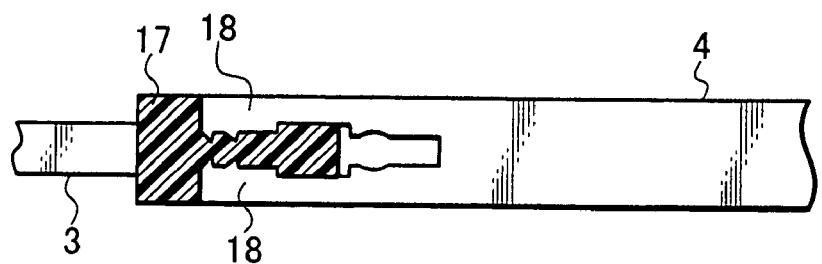

As shown in FIG. 6c, the opposite arm extensions 18 sandwich the circular disc pivot 17, and then they are pushed against the opposite surfaces of the circular disc pivot 17 until the circular disc 17 is partly deformed to be coplanar with the opposite surfaces of the temple end with the nails 19 cut into the disc 17. FIG. 6d is an enlarged longitudinal section showing how the temple 4 is fastened to the circular disc pivot 17.

The opposite arm extensions 18 are pushed against the opposite surfaces of the circular disc pivot 17 until the circular disc 17 is partly deformed, and accordingly it is made to expand radially. As a result, the ring 16 may be somewhat pushed into the circular circumference of the disc pivot 17. This squeezing effectively assures that the circular disc pivot 17 does not come off from the ring 16. Otherwise, the ring 16 having the circular disc pivot 17 fitted therein, is heated to make the disc 17 radially expand, thereby allowing the ring 16 to cut into the circumference of the circular disc pivot 17, effectively preventing the so deformed disc 17 from coming off from the ring 16.

Figure 7A:
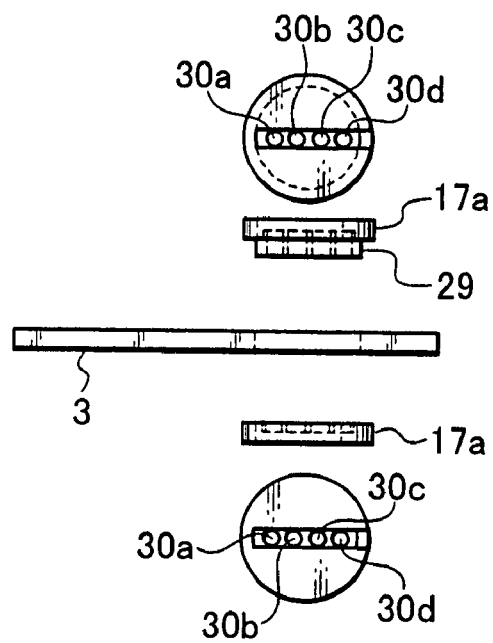
FIGS. 7a and 7b illustrate another manner in which the temple can be fixed to the joint piece.
Figure 7B:
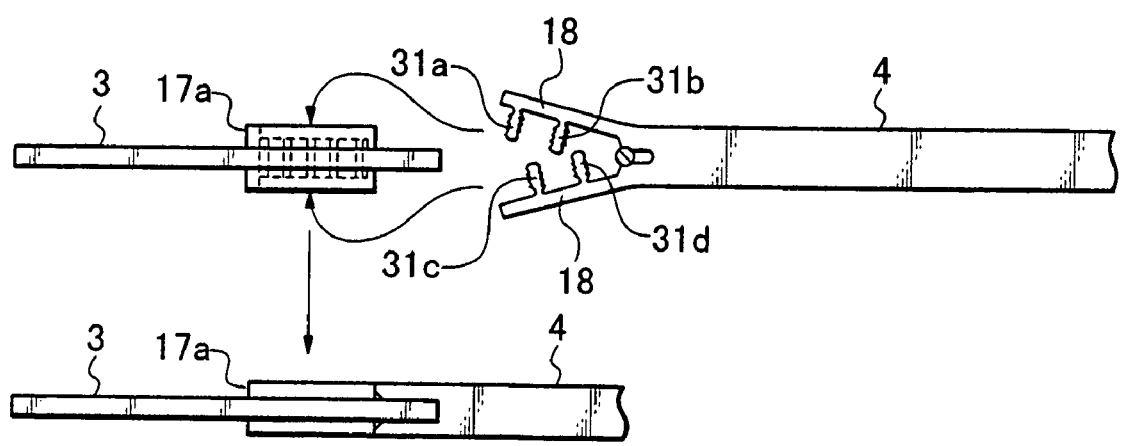

FIGS. 7a and 7b show another joint piece structure, which is different from the one of FIGS. 6a to 6d. Each circular disc pivot 17 is composed of upper and lower disc elements 17a and 17b. Upper disc element 17a has a circular projection 29 to fit in the ring 16, and the upper and lower disc elements 17a and 17b have four small through holes 30a, 30b, 30c and 30d made therein as seen from FIG. 7a. These through holes 30a, 30b, 30c and 30d extend the full thickness of the circular disc pivot 17. A pair of bifurcations 18 of the temple end have pins 31a, 31b and 31c, 31d formed on their confronting inner surfaces as seen in FIG. 7b. These pins have saw-tooth like indentations formed thereon. The bifurcated temple is made by wire-cutting or punching a piece of metal sheet into a required shape which has saw-tooth indented pins integrally formed in each bifurcation. The circular projection 29 of the upper disc element 17a is press-fitted in the ring 16, and the lower disc element 17b is applied to the circular projection 29 of the upper disc element 17a, and then the upper and lower arm extensions 18 of the temple 4 sandwich the upper and lower disc elements 17a and 17b with their saw-tooth indented pins 31a, 31b and 31c and 31d inserted into the through holes 30a, 30c and 30b, 30d of the upper and lower disc elements 17a and 17b.

Specifically the saw-tooth indented pins 31a and 31b of the upper bifurcation 18 are inserted into the through holes 30a and 30c, whereas the saw-tooth indented pins 31c and 31d of the lower bifurcation 18 are inserted into the through holes 30b and 30d. Thus, the upper and lower disc elements 17a and 17b are joined together. The temple can rotate about the circular projection 29 of the upper disc element 17a to be folded on the front of the eyeglasses. Each ring 16 has a stopper extension 21 to prevent the temple from opening beyond a predetermined angle relative to the front of the eyeglasses (see FIG. 5).

Figure 8A:
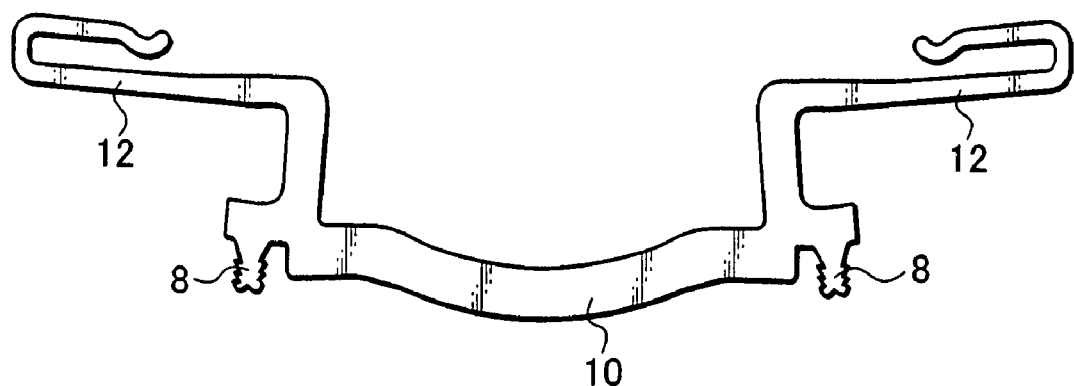
FIGS. 8a and 8b show another bridge.
Figure 8B:
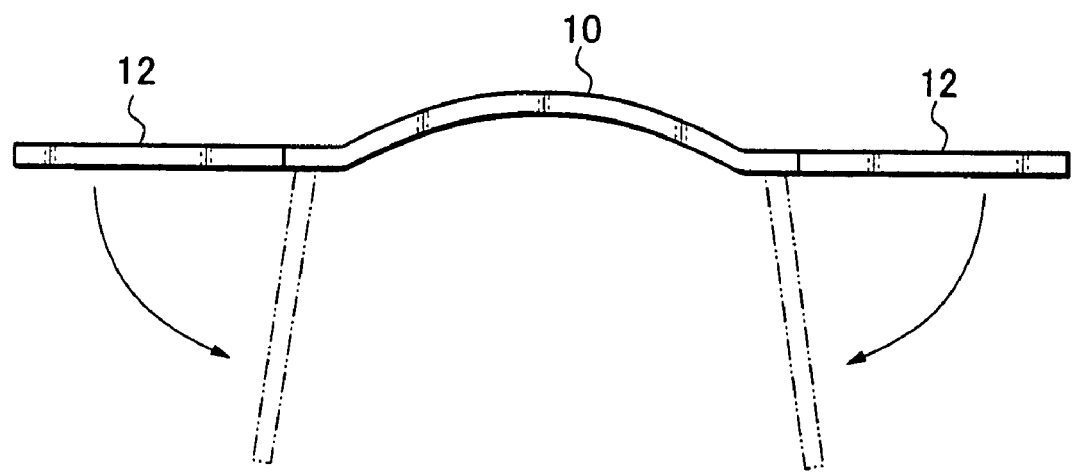

FIGS. 8a and 8b show another shape of the bridge 2, which is basically similar to the bridge of FIG. 4. It has two square pins 8 and two legs 12 integrally connected to its opposite ends. Each square pin 8 has saw-tooth indentations formed on its sides, and the legs 12 are bent down as shown in phantom lines in FIG. 8b. The bridge 2 has no press-fitting extensions formed at its opposite ends. Instead, the opposite ends of the crossbar 10 (reaching short of the pins 8) are press-fitted in the inner edge notches 9 of the lenses 1 (see FIG. 10) to prevent the lens 1 from turning about the square pins 8 (see FIG. 9).

Figure 11:
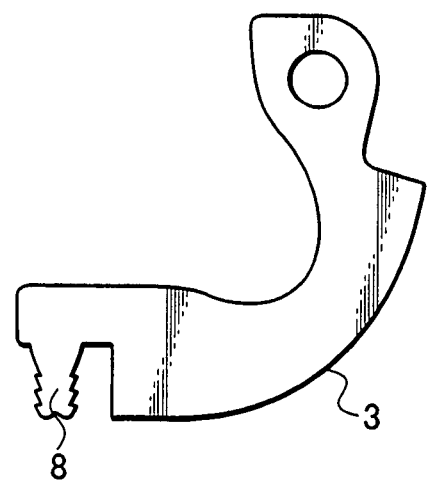
FIG. 11 illustrates another joint piece shape.

FIG. 11 shows another shape of the joint piece 3. It is made by cutting or punching a piece of metal sheet into a curved angle shape which has a square pin 8 and a hole formed at its opposite ends. The square pin 8 has saw-tooth indentations formed on its sides, and is spaced a short distance apart from the arc end to define a narrow gap therebetween.

FIG. 9 shows how the bridge 2 and the joint piece 3 are connected to the opposite sides of bridge 2. The lens 1 has a hole-and-notch made on its opposite sides. The hole 6 and the notch 9 may communicate with each other, as seen from FIG. 10. As seen from FIG. 9, a flanged sleeve 7 is press-fitted into the hole 6 from the front side and one end of the crossbar 10 is fastened to the lens 1 by press-fitting the square pin 8 into the flanged sleeve 7, and by press-fitting the crossbar end into the inner-edge notch 9 of the lens 1. Likewise, one end of the joint piece 3 is fastened to the lens 1 by press-fitting the square pin 8 into the flanged sleeve 7, and by press-fitting the arc end into the outer-edge notch 9 of the lens 1.

Figure 12A:
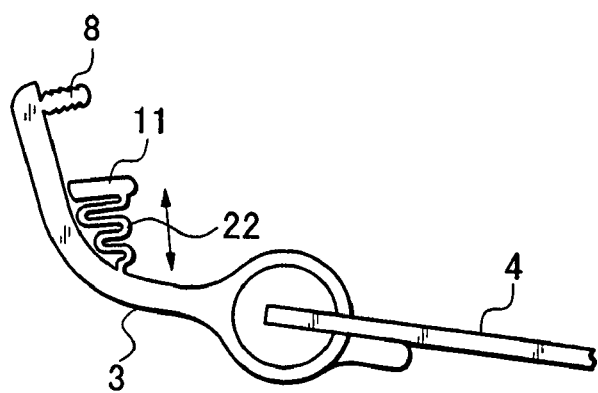
FIG. 12a and FIG. 12b illustrate still other joint piece shapes, respectively.
Figure 12B:
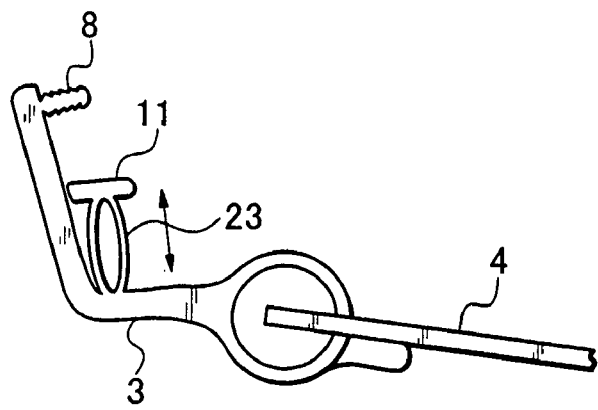

FIGS. 12a and 12b show still other shapes of the joint piece respectively. As seen from the drawings, the press-fitting chip 11 is connected to the joint piece 3 by a resilient extension 22 or 23 extending from the joint piece. The press-fitting chip 11, therefore, is yieldingly bent when being press-fitted in the notch 9 of the lens 1. Thus, the joint piece 3 can be snugly fastened to the lens 1 without the possibility of loosening. The bridge 2 may be equipped with this type of resilient press-fitting chips 11.

Figure 13:
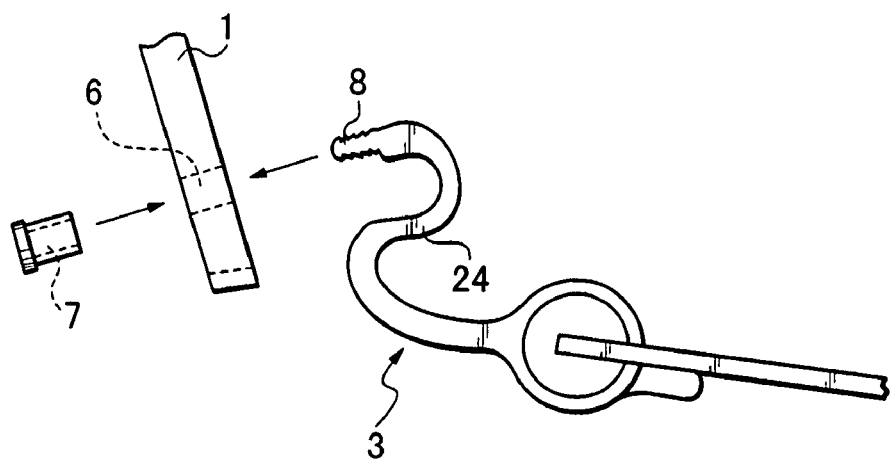
FIG. 13 illustrates still another joint piece shape.

FIG. 13 shows yet another shape of the joint piece. As seen from the drawing, the joint piece takes the shape of the letter "S" on its press-fitting side 24. A flanged sleeve 7 is press-fitted into the hole 6 from the front side, and the pin-like extension 8 of the "S"-shaped joint is inserted in the sleeve 7. The curved section 24 of the "S"-shaped extension of the joint is press-fitted into the notch of the outer edge of the lens.

Figure 14A:
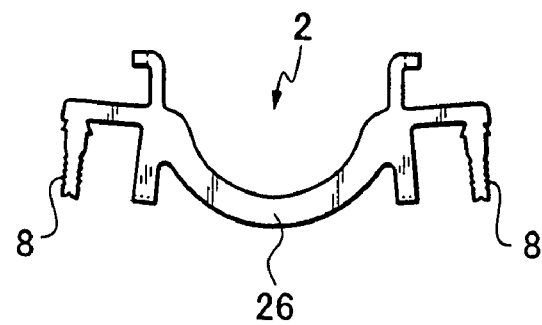
FIGS. 14a and 14b are plan and front views illustrating another bridge shape.
Figure 14B:
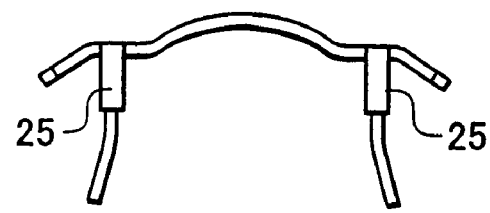
Figure 14C:
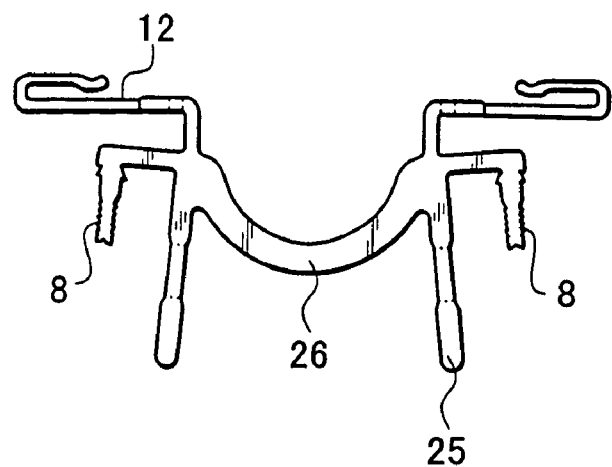
FIG. 14c is plan view illustrating still another bridge shape.

FIGS. 14a, 14b and 14c show still another form of bridge 2, which has press-fitting extensions 25 formed at its opposite ends. As is the case with FIGS. 4a–4d, the bridge 2 has square pin-like extensions 8 formed at its opposite ends, also. Each pin-like extension 8 has saw tooth-like indentations formed on its opposite sides. The press-fitting extension 25 is applied to the circumference of the lens 1, thereby working as anti-rotation means for the lens 1. FIG. 14c shows the flat form of bridge just punched out of a piece of metal sheet, comprising a crossbar 26 having two pin-like extensions 8, two nose pad support leg extensions 12 and two press-fitting extension 25 all formed symmetrically relative to the center of the crossbar 26. The nose pad support leg extensions 12 and press-fitting extensions 25 are bent down as seen from FIG. 14b. Each press-fitting extension 25 is bent into the form of the letter "U", so that it may abut on the lens 1 at two points.

Figure 16A:
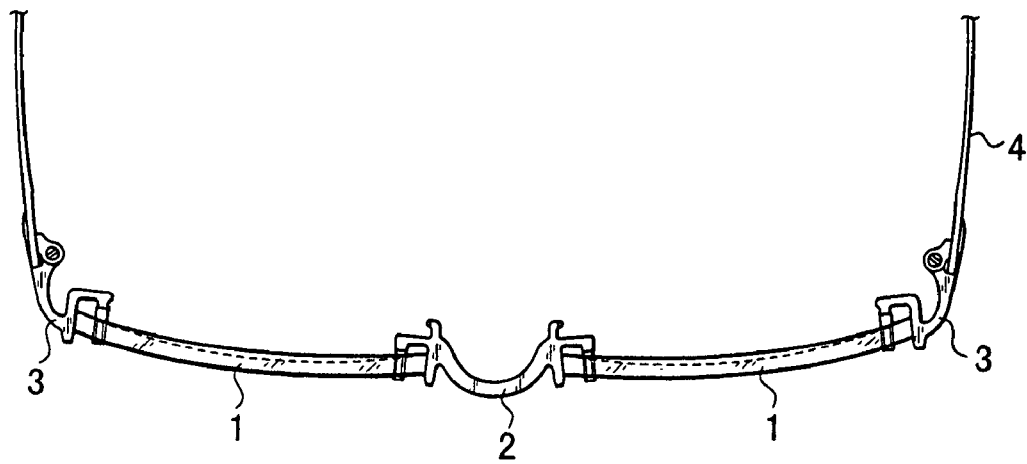
FIGS. 16a, 16b and 16c are plan, front and side views showing rimless eyeglasses according to the present invention.
Figure 16B:
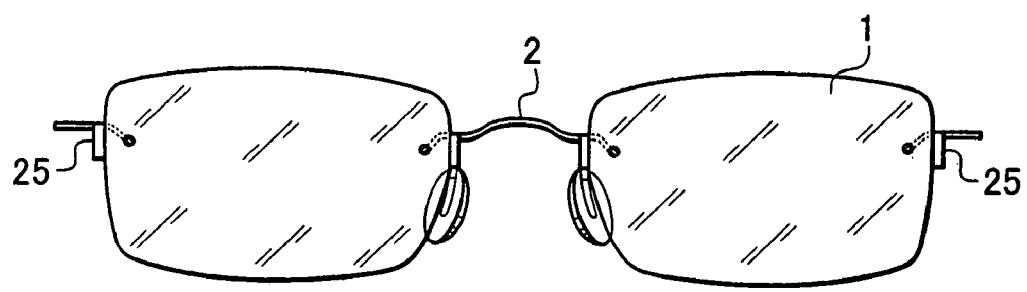
Figure 16C:
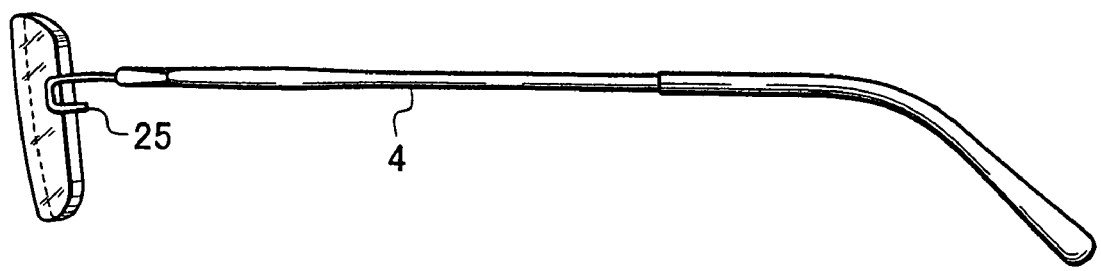

FIGS. 15a and 15b show still another form of joint piece 3. FIG. 15b shows the flat form of joint piece just punched out of a piece of metal sheet. Its press-fitting extension 25 is bent into the form of the letter "U", so that it may abut on the lens 1 at two points, preventing any relative angular rotation. FIGS. 16a, 16b and 16c show a rimless eyeglasses using the bridge 2 of FIGS. 14a–14c and the joint pieces 3 of FIGS. 15a and 15b. Each lens 1 has no notches made on its outer edge. Instead, the "U"-shaped press-fitting extension 25 abuts on the outer edge of each lens 1 at two points, preventing any angular rotation.

Figure 17A:
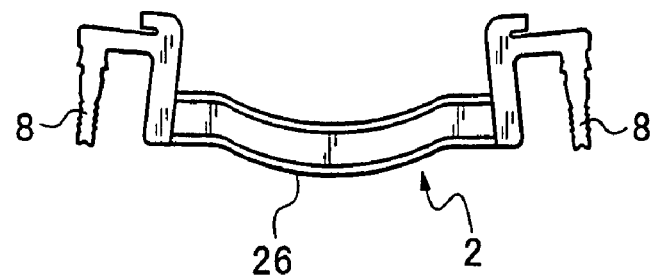
FIGS. 17a and 17b are plan and front views illustrating yet another bridge shape.
Figure 17B:
Figure 18:
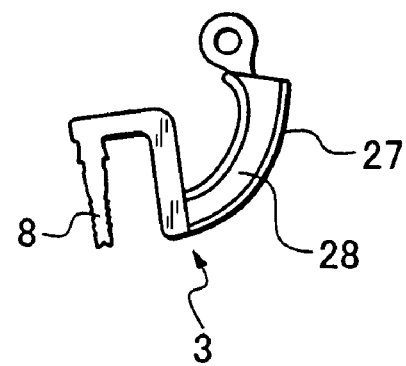
FIG. 18 illustrates still another joint piece shape.
Figure 19A:
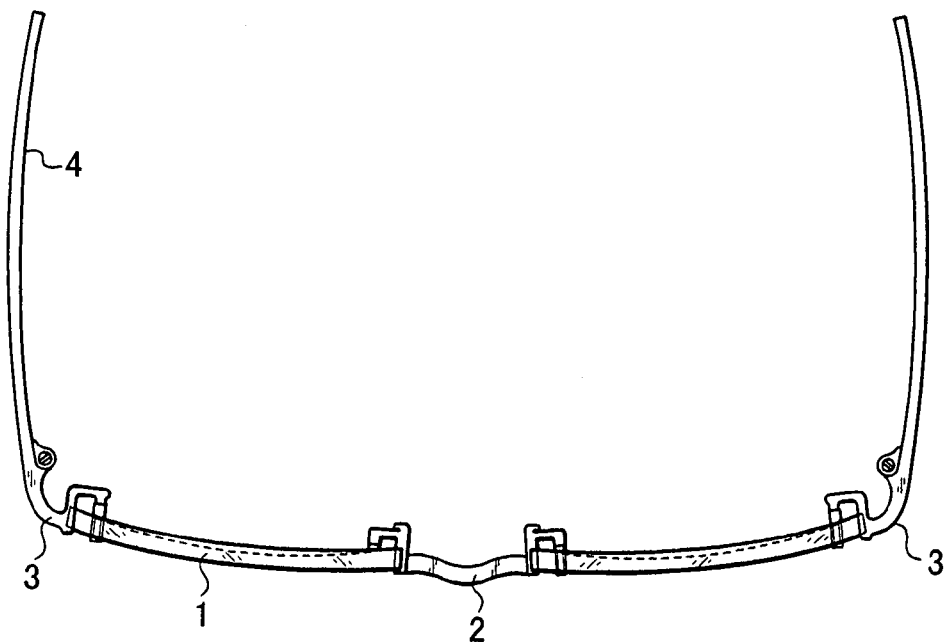
FIGS. 19a, 19b and 19c are plan, front and side views showing still other rimless eyeglasses according to the present invention.
Figure 19B:
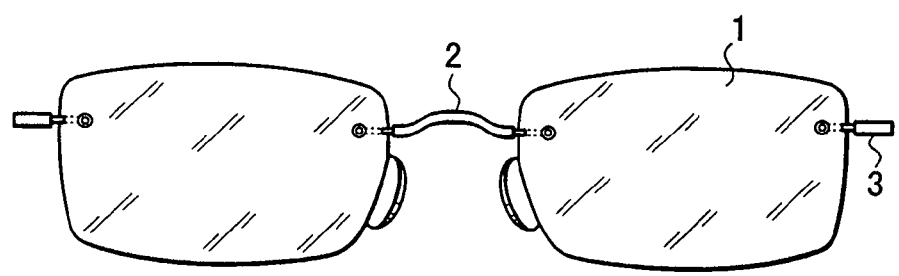
Figure 19C:
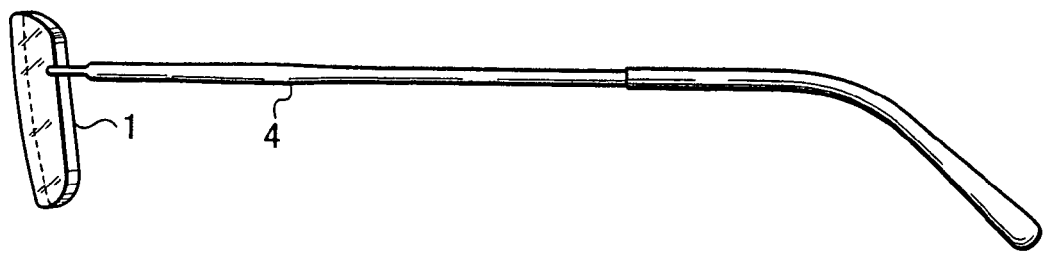
Figure 20:
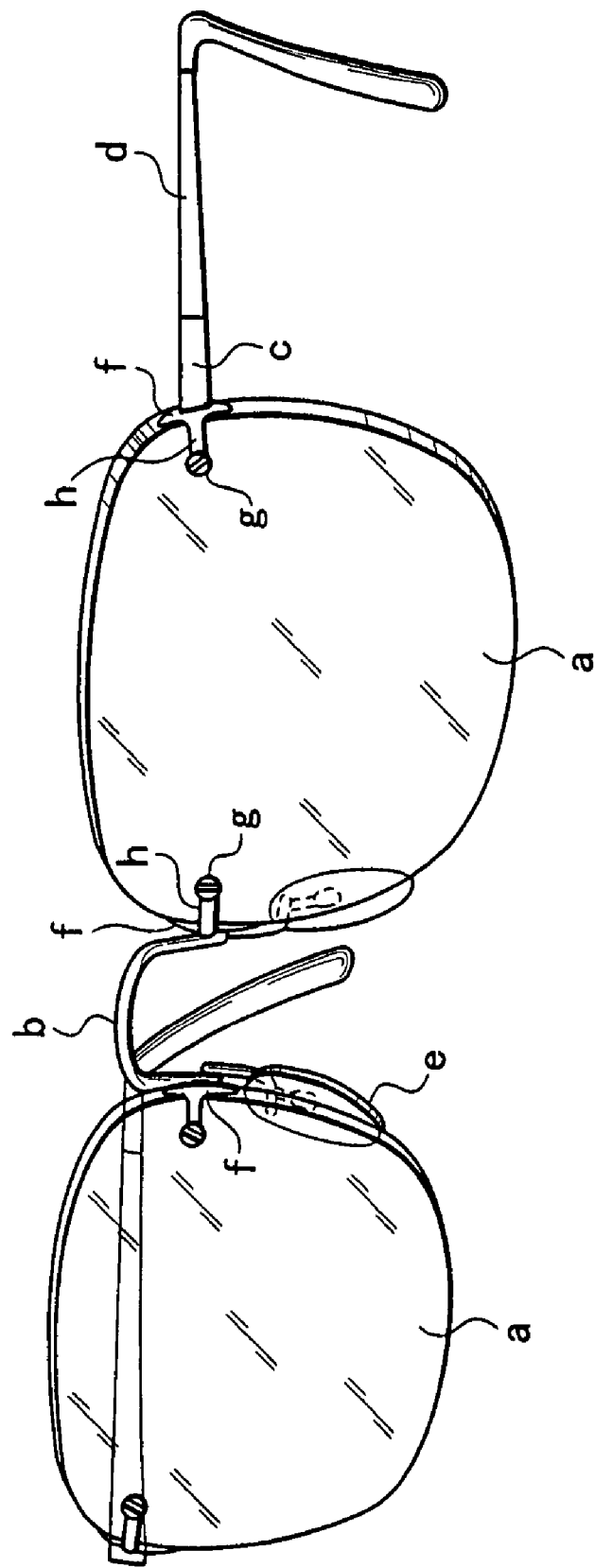
FIG. 20 is a perspective view showing conventional rimless eyeglasses.

FIGS. 17a and 17b show still another form of bridge 2, which is basically similar to FIGS. 8a and 8b, but different only in that the crossbar 26 is coated with resin material as indicated by 27. Likewise, the joint piece 3 has a resin coating 27, as shown in FIG. 18. FIGS. 19a–19c show rimless eyeglasses using the resin-coated bridge 2 of FIGS. 17a and 17b and the resin-coated joint pieces 3 of FIG. 18. Each temple 4 is made of resin material. Thus, the rimless glasses look like resin rimless glasses. As a matter of fact, the resin bridge and joint pieces have no good strength although they provide pleasing appearance. The rimless glasses of FIGS. 19a, 19b and 19c have good strength, while providing the pleasing appearance as if it were made of resin material.

As may be understood from the above, the bridge and joint pieces are made by cutting or punching pieces of metal sheet into required shapes, which are bent into their final shapes. Small holes are made in the lens, and flanged sleeves are press-fitted into the holes, and the pin-like extensions of the bridge and joint pieces are inserted in the sleeves, and fastened to the lens. This arrangement provides the following advantages. The number of manufacturing steps is small, compared with the conventional manufacturing process, and accordingly the manufacturing cost is significantly reduced. Specifically bridges and joint pieces can be made by cutting or punching pieces of metal sheets into required shapes. Evidently this is much simpler and easier than parts being cold-formed by using metal molds. A variety of shapes of parts can be easily provided by cutting pieces of metal sheet with the aid of computers. Thus, demands for small lots of different designs can be met without difficulty.

No soldering work is required, and therefore the number of assembling steps can be reduced. The required precision in assembling parts into eyeglasses can be met to assure that the bridge and joint pieces are tightly fastened to the lenses.

Each temple is hinged to an associated joint piece by making its bifurcated end sandwich the resin disc, which is rotatably fitted in the ring of the joint piece. This arrangement is simpler than the conventional hinge structure, and the temple can be easily fastened to the joint piece. The circular disc of resin material cannot be worn, and therefore, the temple cannot be loosened. The bridge and joint pieces can be coated with resin material, and such resin coated parts and resin temples are assembled into rimless glasses, which look like resin rimless glasses in appearance.

What is claimed is:

1. Rimless eyeglasses comprising:
   a bridge having two opposite end portions;
   two lenses respectively having inner edge portions and outer edge portions, said lenses being coupled together by said bridge such that said inner edge portions of said lenses are connected to said two opposite end portions of said bridge, respectively;
   two joint pieces fixed to said outer edge portions of said lenses, respectively;
   two temples respectively having connection ends and free ends, said connection ends of said two temples being respectively coupled to said two joint pieces by hinges;
   wherein each of said two lenses has an inner through hole and an inner notch formed on said inner edge portion thereof;
   wherein each of said two lenses has an outer through hole and an outer notch formed on said outer edge portion thereof;
   wherein flanged sleeves are respectively press-fit in said inner through holes and said outer through holes of said lenses;
   wherein said bridge comprises a crossbar having two opposite end portions, two pin-like extensions integrally provided at said two opposite end portions of said crossbar, two press-fitting extensions integrally provided at said two opposite end portions of said crossbar, and two leg extensions integrally provided at said two opposite end portions of said crossbar;
   wherein said two pin-like extensions of said bridge respectively have saw-tooth indentations on outer surfaces thereof and are respectively inserted in said flanged sleeves that are press-fit in said inner through holes of said lenses;
   wherein said two press-fitting extensions of said bridge are respectively inserted in said inner notches of said two lenses;
   wherein said two leg extensions of said bridge respectively have hooks at ends thereof arranged to receive nose pads;
   wherein said two joint pieces respectively have inner and outer end portions, and pin-like extensions and press-fitting extensions integrally provided at said inner end portions of said two joint pieces;
   wherein said pin-like extensions of said two joint pieces respectively have saw-tooth indentations on outer surfaces thereof and are respectively inserted in said flanged sleeves that are press-fit in said outer through holes of said lenses;
   wherein said press-fitting extensions of said two joint pieces are respectively inserted in said outer notches of said two lenses;
   wherein said two joint pieces respectively have ring-shaped portions at said outer end portions thereof; and
   wherein resin circular disc pivot portions are respectively mounted to said connection ends of said two temples, and said resin circular disc pivot portions are respectively rotatably fitted in said ring-shaped portions at said outer end portions of said two joint pieces so as to form said hinges.

2. Rimless eyeglasses according to claim 1, wherein
   each of said temples has two arm extensions formed at said connection end thereof; and
   each of said resin circular disc pivot portions is sandwiched between said two arm extensions of one of said temples, so as to mount said resin circular disc pivot portions to said connection ends of said temples, respectively.

3. Rimless eyeglasses according to claim 2, wherein said joint pieces, and said cross bar of said bridge, are coated with a resin material.

4. Rimless eyeglasses according to claim 1, wherein said press-fitting extensions are U-shaped.

5. Rimless eyeglasses according to claim 4, wherein said U-shaped press-fitting extensions of said joint pieces respectively contact outer edge portions of said lenses at two locations so as to prevent rotation of said joint pieces relative to said lenses.

6. Rimless eyeglasses according to claim 5, wherein said joint pieces, and said cross bar of said bridge, are coated with a resin material.

7. Rimless eyeglasses according to claim 1, wherein said joint pieces, and said cross bar of said bridge, are coated with a resin material.

8. Rimless eyeglasses according to claim 1, wherein each of said joint portions and said bridge is formed of sheet metal.

* * * * *